No. 684,705. Patented Oct. 15, 1901.
C. P. MOSHER.
FOOD CUTTER.
(Application filed Mar. 17, 1899.)
(No Model.) 2 Sheets—Sheet 2.
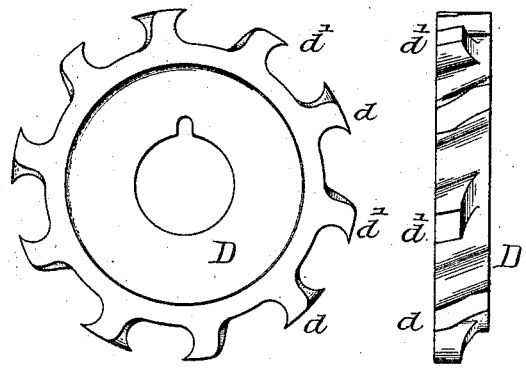
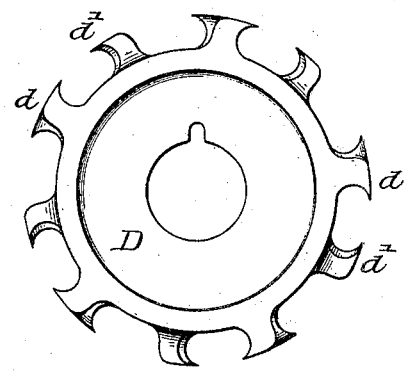
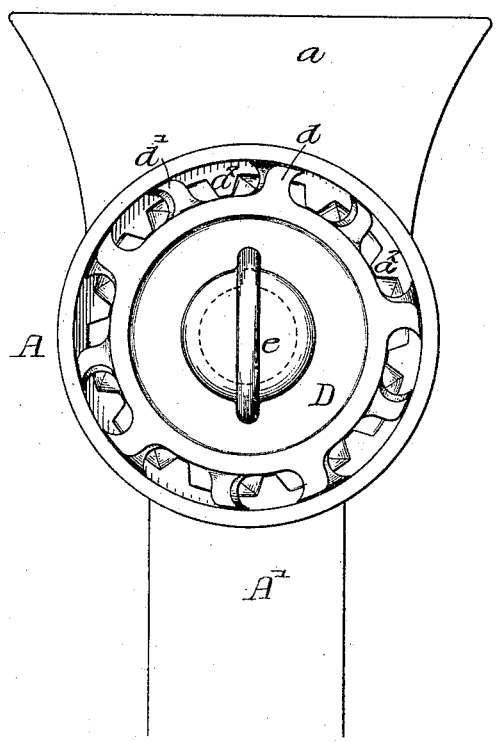
Witnesses:-
Charles DeCou.
Louis M. T. Whitehead.
Inventor:-
Charles P. Mosher:
by his Attorneys.
Howson & Howson

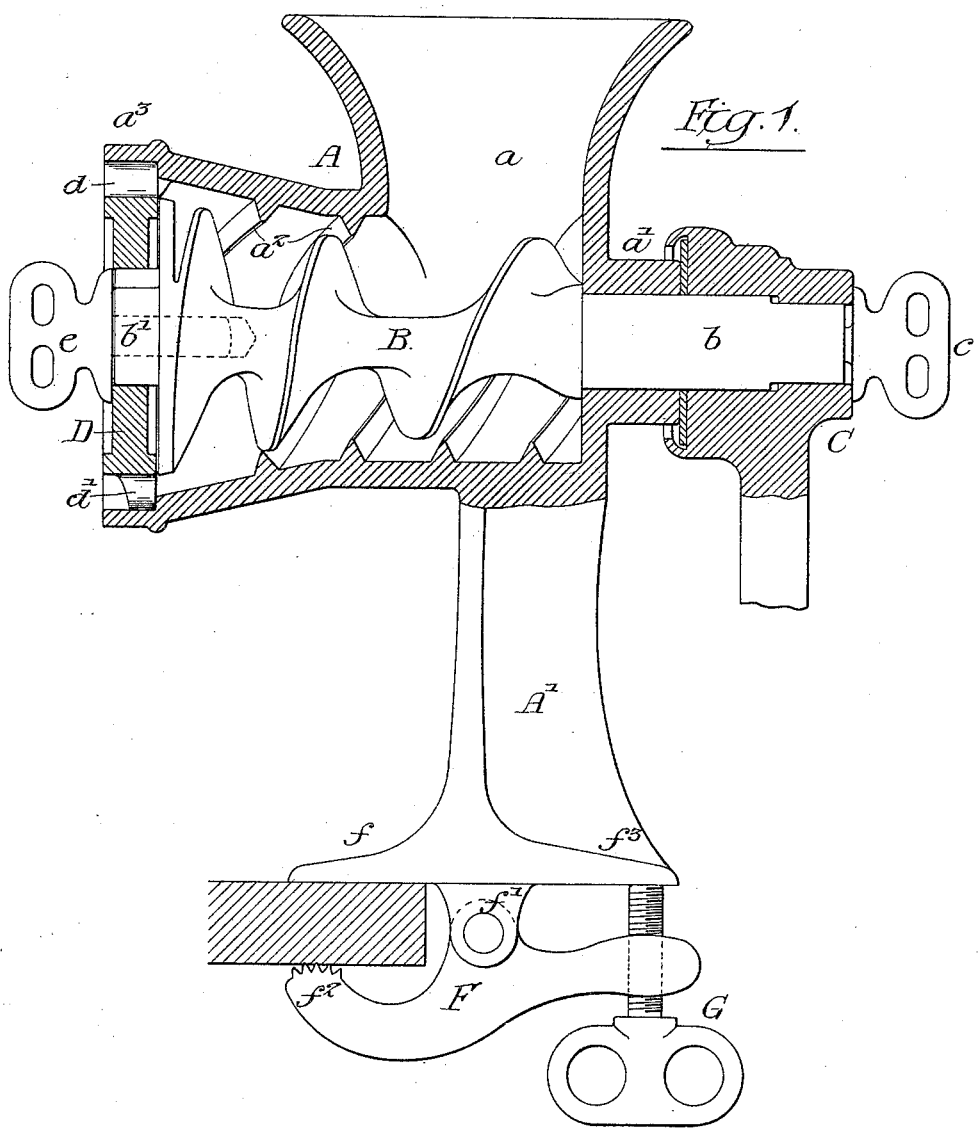

UNITED STATES PATENT OFFICE.

CHARLES P. MOSHER, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

FOOD-CUTTER.

SPECIFICATION forming part of Letters Patent No. 684,705, dated October 15, 1901.

Application filed March 17, 1899. Serial No. 709,522. (No model.)

*To all whom it may concern:*

Be it known that I, CHARLES P. MOSHER, a citizen of the United States, residing in Philadelphia, Pennsylvania, have invented certain Improvements in Food-Cutters, of which the following is a specification.

My invention relates to certain improvements in food-cutters in which an internally-ribbed casing and a feed-screw are used, said feed-screw carrying a toothed disk acting in conjunction with ribs on the casing to cut the food as it is fed through the casing by the feed-screw.

The main object of my present invention is to so construct the disk that the machine will cut either fine or coarse with a single cutter; and a further object of the invention is to so shape the cutting-teeth that they will cut toward the center of rotation; and a still further object of the invention is to make a clamp by which the cutter is firmly secured to its support.

In the accompanying drawings, Figure 1 is a side view, partly in section, illustrating my improved food-cutter. Fig. 2 is an end view. Fig. 3 is an edge view of the cutter detached. Fig. 4 is a face view of one side of the cutter, and Fig. 5 is a face view of the opposite side of the cutter.

A is the casing, having a hopper $a$. The barrel of this casing is flared toward one end, as shown, and has a bearing $a'$ at the opposite end. $a^2$ shows internal spiral ribs, stopping abruptly at the outer edge of the casing, and the ends of these ribs form the fixed portion of the cutter.

B is the feed-screw adapted to the casing. The feed-screw has a journal $b$, mounted in the rear bearing $a'$ and is provided with a handle C, by which it is turned. $c$ is a thumb-screw for retaining the handle in position.

D is a detachable cutter mounted on the hub $b'$ of the feed-screw B. This cutter is made in a single piece and has two cutting-faces, and it will be noticed, on referring to Figs. 3, 4, and 5, that the cutting-teeth $d$ extend from one cutting-face to the other, while the intermediate cutting-teeth $d'$ are only on one face, stopping short of the other face, so that one cutting-face has one-half the number of teeth of the other. Consequently if the cutting-face having only the teeth $d$ is placed to act in conjunction with the ribs $a^2$ then the material will be cut comparatively coarse; whereas if the disk is reversed, so that both the teeth $d$ $d'$ act in conjunction with the ribs $a^2$, then the material will be cut fine. The teeth are preferably curved in the form of hooks, so that the cut as the disk is revolved will not be outward, but will be toward the center of rotation. Consequently there will be no tendency of the material to slip past the cutters without being severed. In some instances the teeth of a single cutter may be made hooked or a double-faced cutter may be made in which the teeth extend from one side to the other and are reversely hooked, as shown. The cutting-disk is held to the feed-screw by means of a thumb-screw $e$, and by turning this thumb-screw it can be forced against the ends of the ribs of the casing, thus insuring a clear cut.

I prefer to form on the end of the casing a flange $a^3$, so that the cutter rests within this flange.

The casing has a depending leg A', having at its base two feet $f$ $f$ and a central pivot-lug $f'$, pivoted to which is a lever F. This lever has two arms $f^2$, preferably situated directly under the feet $f$ $f$, and the other arm of the lever is provided with a clamp-screw G, bearing against the rearwardly-projecting portion $f^3$ of the leg, so that when the clamp is adjusted to a table or other support by turning this screw G the lever F will grasp the support firmly and hold the machine in the fixed position.

I claim as my invention—

The combination in a food-cutter, of a casing having internal ribs extending to the edge of the same and serving as the fixed cutter of the machine, a feed-screw constructed to operate in connection with said casing, and a reversible cutting-disk having teeth on its periphery, said teeth being constructed to coact with the ends of said internal ribs, alternate teeth having cutting edges on one face only of the disk and the others of said teeth having cutting edges on both faces of the disk, substantially as shown and described.

In testimony whereof I have signed my name to this specification in the presence of two subscribing witnesses.

CHARLES P. MOSHER.

Witnesses:
WILL. A. BARR,
JOS. H. KLEIN.